Sept. 12, 1933.  V. TENDERO  1,926,757
HOOD FOR AUTOMOBILES AND THE LIKE
Filed March 4, 1932   2 Sheets-Sheet 2
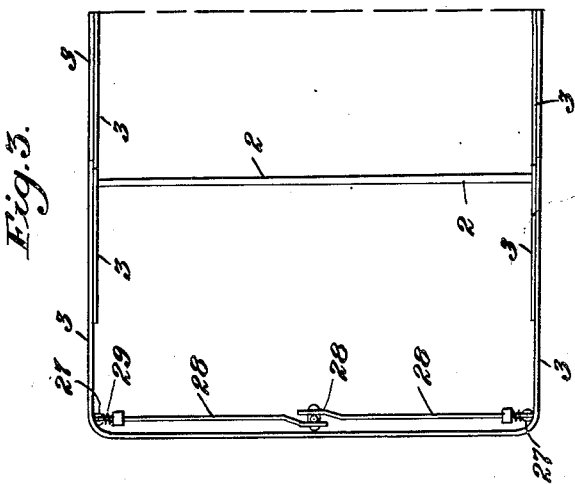
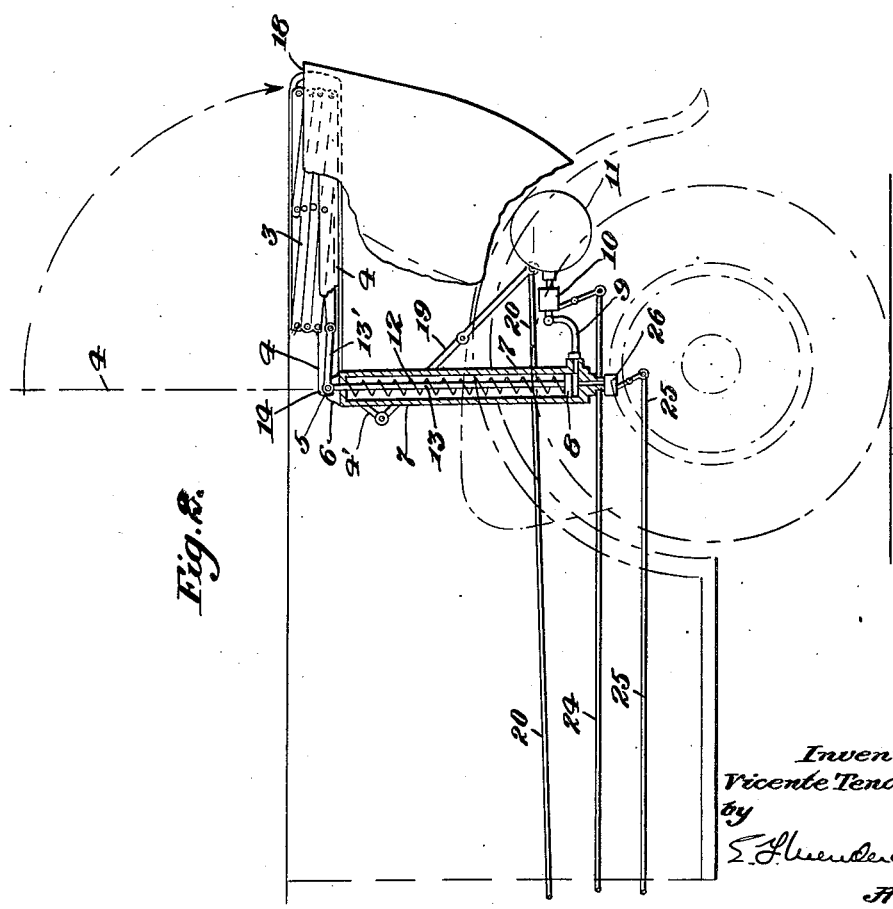
Inventor:
Vicente Tendero,
by
Att'y.

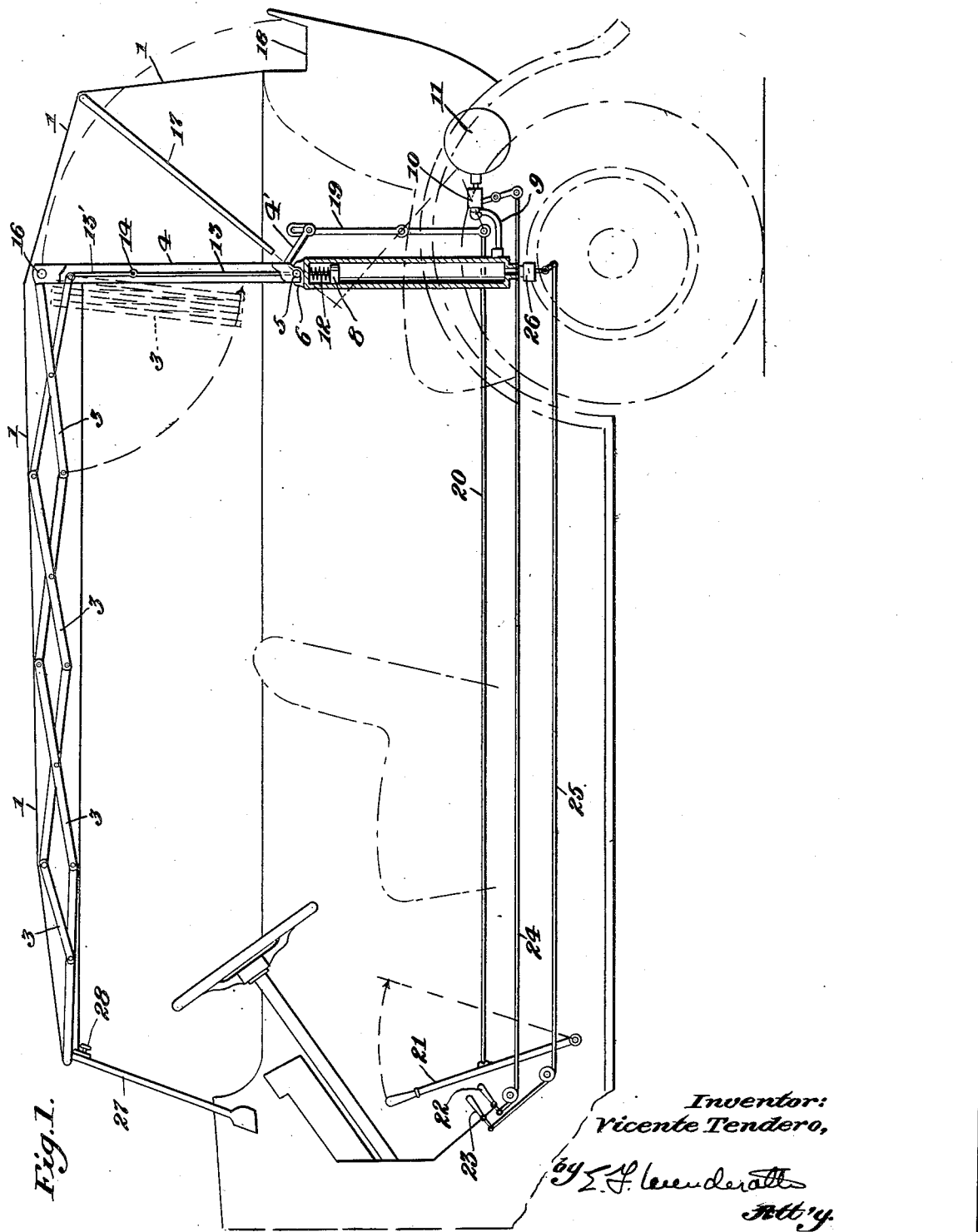

Patented Sept. 12, 1933

1,926,757

UNITED STATES PATENT OFFICE 1,926,757

HOOD FOR AUTOMOBILES AND THE LIKE

Vicente Tendero, Buenos Aires, Argentina

Application March 4, 1932. Serial No. 596,859

4 Claims. (Cl. 296—117)

The present invention relates to improvements in tops for automobiles and the like and has for its object an improved top of the said kind which, in view of its particular construction and advantages resulting therefrom, is designed to replace the tops now in use.

One object of my invention is to provide a mechanism of easy, simple and almost automatic operation, this being attained by the provision of a novel arrangement of hoops capable of being extended or retracted with the aid of a toggle device actuated by mechanical, particularly pneumatic, means from a point near the driver's seat, so that, when necessary, the top of the car may be extended or retracted without the necessity of the driver, or other persons descending from the vehicle.

Besides offering great comfort, this feature is practical in every respect and solves a long-existing problem, since it is often necessary, as in the case of sudden and unexpected rains, to hastily extend, or mount, the top, in action which is impossible with the type of tops now in use. Therefore, the top according to the present invention offers considerable advantages for automobile drivers and the public in general.

For the better understanding of the object of the present invention the improved top is illustrated on the accompanying drawings, the three figures of which show a preferred embodiment given by way of example.

In the drawings:—

Fig. 1 is a side elevation of an automobile with the improved top in extended, or operative, position, and illustrating the actuating mechanism actuated by means located in the vicinity of the driver's seat.

Fig. 2 is a similar view of the rear portion of an automobile showing the top in folded, or inoperative position; and Fig. 3 is a plan view showing the bolt serving for the connection of the end of the top to the uprights or frame of the windshield.

In these figures, equal or corresponding parts and elements are designated by like characters of reference.

As is clearly shown in the drawings, 1 denotes the fabric constituting the hood and which is mounted and seated upon the hoops 2 (Fig. 3) connected at their ends to a pair of toggle devices 3 formed, as shown in Fig. 1, by a plurality of segmental bars pivoted on to another so that these devices, when extended constitute the side members of a tensioned frame for the top.

The said toggle devices are supported from an upright 4 capable of being raised and lowered and located at the rear portion of the vehicle, and pivoted at 5 to the support 6 of the pneumatic cylinder 7 provided with a piston 8. Into the lower end of the cylinder opens a tube 9 provided with a valve 10 which, when opened, permits the passage into the cylinder of compressed air supplied from the device 11 located at the interior of the vehicle body, so that the said piston 8 may be forced in an upward direction.

A spring 12 tends to force the piston 8 downwards and the latter has, rigidly secured thereon, a shaft 13 pivoted at 14 to an extension 13' the free end of which is pivoted to one of the bars of the toggle while the other end-bar thereof, which is pivoted to the latter bar is, pivoted at 16 to an upper fixed point of the upright 4.

Thus, assuming that the piston 8, due to the pressure exerted by its spring 12, has reached its lower position within the cylinder 7, the toggle devices will be in a folded position as indicated in dot and dash lines in Fig. 1. Then, opening the valve 10, the compressed air admitted into the cylinder pushes the piston upwardly and, therewith, the shafts 13, 13' thus extending the bars forming the toggles with uniform tensioning of the fabric 1 of the top, as indicated by black lines in Fig. 1.

For the mounting of the rear portion of the hood there is provided a hoop 17 pivoted at 5 which, as already stated, is the pivotal point of the upright 4 so that the said upright as well as the hoop 17 and the ensemble formed by the folded toggles and the fabric 1 of the hood, may be easily folded to the rear as indicated by the arrow in Figs. 1 and 2, and housed within a receptacle 18 formed at the rear and side portions of the vehicle body, as shown in Fig. 2, so as to not impair the outer neat appearance thereof.

The mechanism to affect this tilting movement of the folded hood comprises an arm 4' secured to the upright 4 and connected to a lever 19, the other end of which is pivoted to a bar 20 depending from the hand lever 21; thus, actuation of this lever in one or the other direction, will result in tilting or elevating the upright 4 and the ensemble connected thereto.

As shown, the lever 21 is located near the driver's seat, together with two further levers 22 and 23, the former serving by means of a cable 24, to actuate the valve 10 which, as already explained, controls the passage of compressed air into the cylinder 7. The other lever 23 is connected by means of a further cable 25 to a relief valve 26 serving for the discharge of air from the cylinder so that the piston may return to its lowermost position in order to fold the toggles of the top.

*Operation*

The operation of the hereinbefore described hood is as follows: assuming the top to be in the folded position indicated in Fig. 2, and in order to unfold, or mount the same, the lever 21 is actuated which, through bar 20 and lever 19, tilts the upright 4 and the ensemble thereto connected, to the upright position indicated in dotted lines in Fig. 1; thereafter the lever 22 is actuated, thereby opening the valve 10 and permitting the passage of compressed air from the reservoir 11 into the cylinder 7, which air forces the piston 8 upwards to its position indicated in black lines in Fig. 1. Since the bars 13, 13' respond to this movement, the latter is transmitted to the toggle devices 3 which thus are rapidly extended until firmly tensioning the fabric 1 of the top, which is then secured to the upright of the windshield 27 by means of the spring-pressed bolt 28 so that by simple coincidence of the last hoop of the top, the latter remains firmly connected and secured.

In order to dismount the top, the connection between the latter and the uprights of the windshield 27 is broken by manually actuating the bolt 28; then by means of the lever 23 the air is discharged from the interior of cylinder 7, thus permitting the spring 12 to distend, pushing the piston downwardly with the shaft 13 which, thus fold the toggle devices 3 together with the fabric 1, as indicated in dotted lines in Fig. 1. Finally, actuating the lever 21, the thus folded ensemble is tilted backwards into the receptacle 18 and again assumes its original position as shown in Fig. 2.

Obviously, when carrying the invention into practice, modifications may be introduced as regards the construction and form of the ensemble described, as well as the actuating mechanism for the top without departing from the fundamental principles of the invention as clearly specified in the appended claims.

Having thus fully described and ascertained the nature of my said invention, and the manner in which the same is to be carried into practice, I declare that what I claim as of my exclusive proprietorship is:

1. A top for automobiles and the like, comprising lateral toggle devices, fabric mounted on said toggle devices, a reservoir for compressed air, cylinders communicating with said reservoir, pistons movable in said cylinders, shafts connecting with said pistons and with said toggle devices, to transmit the energy of the pistons to said toggle devices, means for controlling the passage of air from the reservoir to said cylinders, remotely located means for actuating said last-mentioned means, springs acting against said pistons, in opposition to the pressure of the compressed air, the tension of which springs is less than the maximum pressure of the air, whereby the toggle devices are extended by the compressed air against tension of said springs, and means for discharging the compressed air from each cylinder, whereby the springs cause the retraction of the toggle devices and the folding of the top.

2. A top for automobiles and the like, comprising lateral toggle devices, fabric mounted on said toggle devices, a reservoir for compressed air, cylinders communicating with said reservoir, pistons movable in said cylinders, shafts connecting with said pistons and with said toggle devices, to transmit the energy of the pistons to said toggle devices, means for controlling the passage of air from the reservoir to said cylinders, remotely located means for actuating said last-mentioned means, springs acting against said pistons, in opposition to the pressure of the compressed air, the tension of which springs is less than the maximum pressure of the air, whereby the toggle devices are extended by the compressed air against tension of said springs, means for discharging the compressed air from each cylinder, whereby the springs cause the retraction of the toggle devices and the folding of the top, the said shafts being pivotally connected to said pistons, and remotely actuable means for tilting said shafts, after contraction of the toggle devices, into a rest position.

3. A top for automobiles and the like, comprising lateral toggle devices, fabric mounted on said toggle devices, a reservoir for compressed air, cylinders communicating with said reservoir, pistons movable in said cylinders, shafts connecting with said pistons and with said toggle devices, to transmit the energy of the pistons to said toggle devices, means for controlling the passage of air from the reservoir to said cylinders, remotely located means for actuating said last-mentioned means, springs acting against said pistons, in opposition to the pressure of the compressed air, the tension of which springs is less than the maximum pressure of the air, whereby the toggle devices are extended by the compressed air against tension of said springs, means for discharging the compressed air from each cylinder, whereby the springs cause the retraction of the toggle devices and the folding of the top, a windshield on the automobile, a frame therefor, a bolt located on said frame, and means on the front of the toggle devices cooperating with said bolt to secure the extended top in position.

4. A top for automobiles and the like, comprising lateral toggle devices, fabric mounted on said toggle devices, a reservoir for compressed air, cylinders communicating with said reservoir, pistons movable in said cylinders, shafts connecting with said pistons and with said toggle devices, to transmit the energy of the pistons to said toggle devices, means for controlling the passage of air from the reservoir to said cylinders, remotely located means for actuating said last-mentioned means, springs acting against said pistons, in opposition to the pressure of the compressed air, the tension of which springs is less than the maximum pressure of the air, whereby the toggle devices are extended by the compressed air against tension of said springs, means for discharging the compressed air from each cylinder, whereby the springs cause the retraction of the toggle devices and the folding of the top, the said shafts being pivotally connected to said pistons, remotely actuable means for tilting said shafts, after contraction of the toggle devices, into a rest position, a windshield on the automobile, a frame therefor, a bolt located on said frame, and means on the front of the toggle devices cooperating with said bolt to secure the extended top in position.

VICENTE TENDERO.